United States Patent
Breider et al.

(10) Patent No.: US 7,081,825 B2
(45) Date of Patent: Jul. 25, 2006

(54) INTERFERENCE MEASURING PROBE

(75) Inventors: Dominique Breider, Lonay (CH);
Marc-Henri Duvoisin, Préverenges (CH); Dominique Marchal, Vallorbe (CH); Vincent Thominet, Morges (CH)

(73) Assignee: Robert Bosch GmbH, Stuttgart (DE)

( * ) Notice: Subject to any disclaimer, the term of this patent is extended or adjusted under 35 U.S.C. 154(b) by 147 days.

(21) Appl. No.: 10/761,483

(22) Filed: Jan. 20, 2004

(65) Prior Publication Data

US 2004/0165191 A1    Aug. 26, 2004

(30) Foreign Application Priority Data

Jan. 17, 2003   (DE) ................ 103 01 607

(51) Int. Cl.
*G08B 21/00* (2006.01)
(52) U.S. Cl. ............................... 340/686.5; 340/686.1
(58) Field of Classification Search ............ 340/686.1, 340/686.3, 686.5, 524; 356/489, 495, 497, 356/336, 369, 511; 250/201.3, 225
See application file for complete search history.

(56) References Cited

U.S. PATENT DOCUMENTS

| | | | |
|---|---|---|---|
| 4,848,908 A | 7/1989 | Huang | 356/489 |
| 4,905,311 A * | 2/1990 | Hino et al. | 250/225 |
| 4,906,094 A * | 3/1990 | Ashida | 356/336 |
| 5,156,461 A * | 10/1992 | Moslehi et al. | 374/121 |
| 5,640,270 A | 6/1997 | Aziz et al. | 359/368 |
| 5,907,400 A * | 5/1999 | Aziz | 356/511 |
| 6,545,761 B1 * | 4/2003 | Aziz et al. | 356/497 |

FOREIGN PATENT DOCUMENTS

| | | |
|---|---|---|
| DE | 19721843 | 2/1999 |
| DE | 19808273 | 9/1999 |
| DE | 10057540 | 6/2002 |

* cited by examiner

*Primary Examiner*—Van T. Trieu
(74) *Attorney, Agent, or Firm*—Kenyon & Kenyon LLP

(57) ABSTRACT

A method and a device for measuring at least one test surface and a reference test surface having an interference measuring probe which emits a first measuring beam which is aligned with respect to the reference test surface, are described. The measuring probe emits at least one second measuring beam, which is aligned with respect to at least the at least one test surface.

17 Claims, 3 Drawing Sheets

INTERFERENCE MEASURING PROBE

FIELD OF THE INVENTION

The present invention relates to a method and a device for measuring the position of at least one test surface in relation to a reference test surface, including an interference measuring probe that emits a first measuring beam, which is aligned with respect to the reference test surface.

BACKGROUND INFORMATION

Mechanical calipers or interference measuring probes are used for measuring surfaces in the in the production of mechanical parts, e.g., for measuring the alignment of internal rotational surfaces such as, for example, bores or cones.

Such mechanical or optical measuring probes scan the surface of a workpiece point-by-point. In order to measure one surface or a plurality of surfaces of the workpiece, the measuring probes and the workpiece are moved and aligned in relation to each other, and additional measuring points are scanned in a specific pattern. If the alignment of internal rotational surfaces is to be measured, in the simplest case, two internal surfaces must be scanned, whose position in relation to each other is determined. If interference measuring probes are used for this purpose, the measuring beam must strike the particular test surface orthogonally, and the modulation interferometer on the optical path must be tuned to the particular test surface, i.e., the focal point of the measuring beam must maintain a specific distance from the modulation interferometer if the measuring probe is appropriately positioned on or near the particular test surface.

In particular when surfaces are measured that are not aligned parallel or concentrically with each other, the measuring device is subjected to elaborate modification to ensure that the measuring beam strikes the particular test surface perpendicularly. This necessary modification after measuring a first test surface, also referred to here as a reference test surface, and before measuring a second test surface inclined in relation to it must be done in a highly precise manner in order not to lose the reference to the reference test surface.

SUMMARY OF THE INVENTION

In contrast, the method of the present invention for measuring at least one test surface and a reference test surface has the advantage that at least one second measuring beam is emitted, which is aligned with respect to at least the at least one test surface. Correspondingly, the device of the present invention for measuring at least one test surface and a reference test surface has the advantage that the interference measuring probe emits at least one second measuring beam, which is aligned with respect to at least the at least one test surface. Advantageously, the method of the present invention and the device of the present invention are used to measure the position of at least one test surface in relation to a reference test surface when at least one test surface and one reference test surface are measured.

Accordingly, an interference measuring probe of the present invention may be used to determine the exact positions of test surfaces in relation to each other in a very simple manner without the necessity of modifying the measuring device because of the presence of both a measuring beam aligned with the reference test surface and at least one second measuring beam aligned with at least the at least one additional test surface. In this way, the interference measuring probe is only required to be positioned to measure a particular test surface or the reference test surface, as a result of which the reference between the at least one test surface and the reference test surface is not lost in any event.

If each measuring beam is produced by splitting a light beam, preferably using a reflecting prism, a simple adaptation of known interference measuring probes and interferometers operating with them is made possible in particular. Instead of a mirror diverting the measuring beam in a specific angle, a light beam produced in the measuring probe or conducted into it is split into a plurality of measuring beams, each of which is deflected at a specific angle in order to be aligned with respect to the test surface or reference test surface to be measured by the particular measuring beam. As an alternative, it might also be possible to produce a plurality of light beams in the measuring probe or conduct them into the measuring probe, at least one measuring beam being produced from each light beam.

If all measuring beams have an optical path of identical length, then an interferometer, which analyzes the superposition of the measuring beam and reflected measuring beam, is able to analyze all measuring beams in the same manner without further actions and without the necessity of a retuning.

If a measuring beam is orthogonal to a test surface or the reference test surface, the measuring beam may then be superimposed on the reflected measuring beam in a simple manner in particular and it is not necessary to provide a complex optical structure in the measuring probe for this purpose.

If, in one measuring position of the interference measuring probe, only one measuring beam is focused on a test surface or on the reference test surface, preferably through a suitable selection of the deflection of all measuring beams emitted by the interference measuring probe, it is then possible to perform a very simple analysis in particular because in each measuring position only one measuring beam, for which the measuring probe is positioned in reference to the particular test surface or reference test surface to be measured, delivers an acceptable result.

If, in one measuring position of the interference measuring probe, at least two differently polarized measuring beams are focused on different surfaces of the at least one test surface and the reference test surface, preferably by a selection of the suitable deflection of the measuring beams, the individual reflecting surfaces defining the particular deflection causing the different polarization, preferably by different dielectric layers applied to the individual reflecting surfaces, it is not necessary to reposition the measuring probe from the at least one test surface to the reference test surface for the measurement because it is possible to analyze the individual measuring signals while taking the polarization into account. In this case, it is possible to detect the position of the surfaces to be measured in relation to each other in a way that is in particular precise and not subject to error; however, the polarizations possible and differentiable for analysis place limits with respect to the number of surfaces in one measuring position that may be measured in relation to each other.

If, in one measuring position of the interference measuring probe, it is possible to focus at least two measuring beams onto different surfaces of the at least one test surface and the reference test surface, which are preferably focused via an electrical shutter in the time-division multiplex, an interference measuring probe now having a more complex structure compared to the structure previously described results; however, there are no limits due to possible polarizations; it is instead possible to produce any desired number of measuring beams that may be queried in succession in a particular measuring position. The three different possibilities of focusing described above may be combined in any desired manner. If all the components used to form the measuring beams have an at least partially cylindrical external shape with an identical external diameter and they are installed in a centering tube with a corresponding internal diameter, the mechanical complexity of the assembly of the interference measuring probe is then reduced due to an at least partially automatic alignment of the necessary components.

The method and device of the present invention are preferably used to measure the alignment of different internal rotational surfaces. However, it is also possible according to the present invention in particular to measure other properties of the surfaces to be measured in a simple manner such as, for example, their roughness. To do so, it is not necessary to consider a relative position of the test surfaces in relation to each other or to the reference test surface, and it is not necessary to make sure that this reference is not lost through the measurement itself, but rather the alignment of the individual measuring beams to the particular test surface or reference test surface makes it unnecessary to modify the interference measuring probe in this case also.

DETAILED DESCRIPTION

Figure 1:
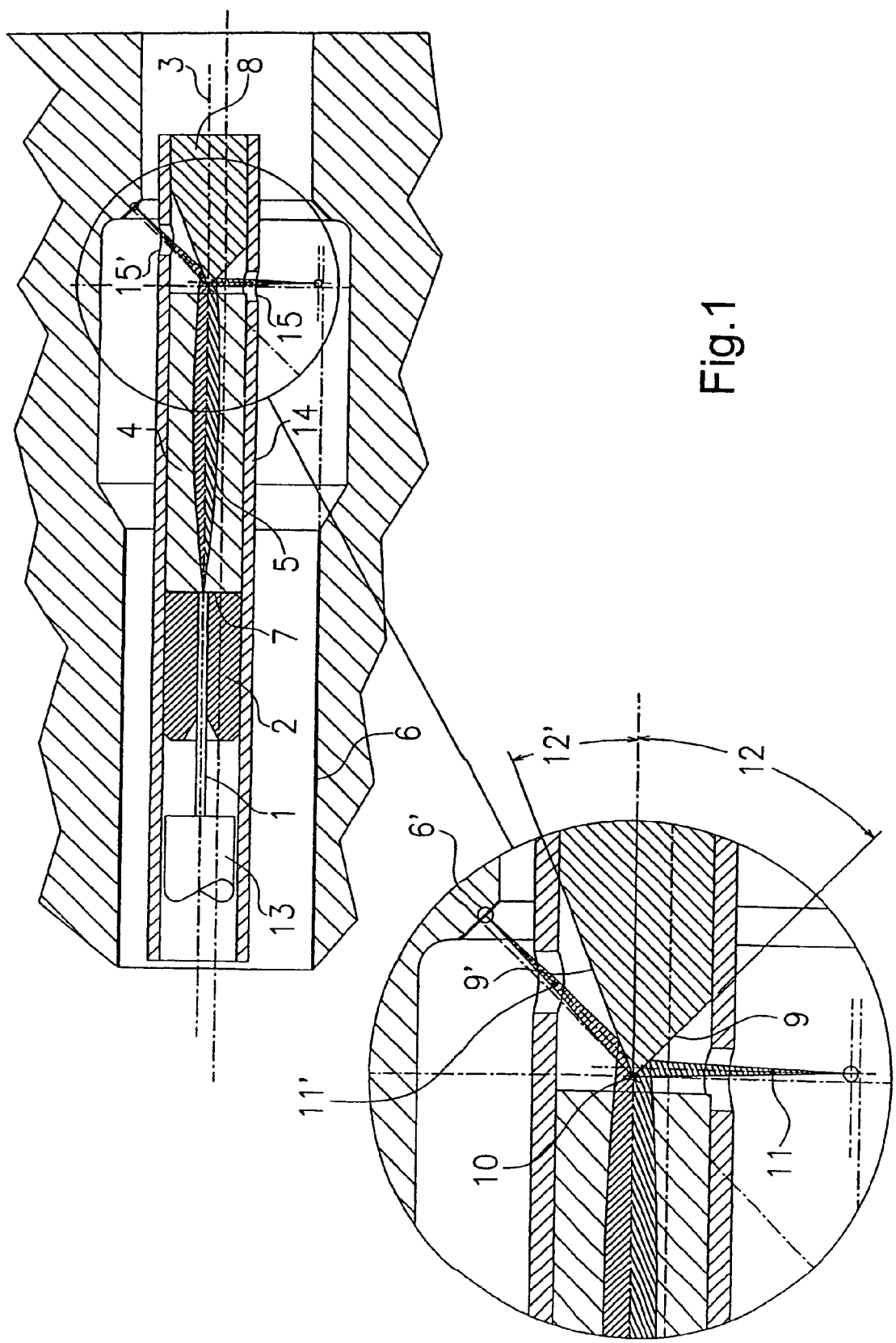
FIG. 1 shows the structure of a measuring probe according to the present invention, having two measuring beams.

FIG. 1 shows an interference measuring probe according to the present invention, which, consistent with a Mireau interferometer, is configured with two measuring beams. The end of a single-mode optical waveguide 1, through which a light beam 5 is guided into the interference measuring probe, is aligned by a centering part 2 with an optical axis 3 of an optical system 4 connected downstream of single-mode optical waveguide 1. Optical system 4 is used to focus light beam 5 emerging from single-mode optical waveguide 1. Behind optical system 4 a beam splitter 8 is located in the beam path of light beam 5, beam splitter 8 being made up of two plane mirror surfaces 9, 9', each of which produces one measuring beam 11, 11', respectively. A first measuring beam 11 is produced by a first plane mirror surface 9 in such a way that it is aligned with the internal rotational surface of a pilot hole 6 of the component to be measured, which may be, for example the reference test surface, and a second measuring beam 11' is produced by a second plane mirror surface 9' in such as way that it is aligned with the internal rotational surface of a valve seat 6' of the component to be measured, which may be, for example, the at least one test surface. To this end, first measuring beam 11 is emitted from the interference measuring probe essentially perpendicularly and second measuring beam 11' is emitted from the interference measuring probe essentially at a 45° angle to its tip, i.e., in the direction of beam splitter 8.

In FIG. 1, the position of the interference measuring probe is shown in which second measuring beam 11' is focused on valve seat 6' of a common-rail valve body and is thus able to scan valve seat 6', while first measuring beam 11 delivers no measuring signal because in this measuring position of the measuring probe, no surface to be scanned is located in the measuring range of first measuring beam 11, as will be explained below also with reference to FIG. 3.

In order to be able to scan the pilot hole of the common-rail valve body using first measuring beam 11, the interference measuring probe must be moved axially and radially in such a way that the focal point of measuring beam 11 is positioned on pilot hole 6. In this position of the measuring probe, second measuring beam 11' does not deliver a measuring signal because no surface to be scanned is located in its measuring range, as will be described in greater detail with reference to FIG. 2.

In order to obtain an interference, i.e., to configure the Mireau interferometer, a semireflective silver plating 7 has been applied to the output surface of single-mode optical waveguide 1, which as an alternative, might also be applied to a refractive plane surface aligned with light beam 5, it being possible for the plane surface to be in the parallel beam path or in the intermediate image plane or in the object plane of optical system 4. Optical system 4 may be implemented using an index gradient lens or one or a plurality of spherical or aspherical lenses.

The silver plating of beam splitter 8, which is tuned to the wavelength of light beam 5, may be produced by cathodic sputtering or dielectric coating. An edge 10 produced by the intersection of the two reflecting surfaces 9, 9' should be as sharp as possible. To that end, beam splitter 8 is preferably manufactured from a very hard material, such as sapphire, for example. The position of edge 10 in light beam 5 is a function of the luminous fluxes desired in measuring beams 11, 11'. If light beam 5 is to be split into more than two measuring beams, instead of edge 10, a point is produced; however, in other respects, the mode of operation and configuration of the interference measuring probe are also derived from this description, which was selected due to its greater simplicity.

First plane mirror surface 9 has a first angle 12 in relation to optical axis 3 and second plane mirror surface 9' has a second angle 12' in relation to optical axis 3. These angles 12, 12' of beam splitter 8 may be used to deflect measuring beams 11, 11' in the desired directions. In order for each of measuring beams 11, 11' to strike the surfaces they are intended to measure orthogonally, i.e., first measuring beam 11 striking the internal rotational surface of pilot hole 6 and second measuring beam 11' striking the internal rotational surface of valve seat 6', angles 12, 12' must be selected to be somewhat smaller than one-half of the desired angle of deflection of measuring beams 11, 11'. For a single-mode optical waveguide 1 having a numerical output aperture of 0.12, it is necessary, for example, for first angle 12 to be approximately 43° if first measuring beam 11 is to be deflected 90° in relation to optical axis 3 and second angle 11' must be approximately 21° if second measuring beam 11' is to be deflected 45° in relation to optical axis 3.

A jacket 13 of optical waveguide 1, centering part 2, optical system 4, and beam splitter 8 are aligned by a centering tube 14. Centering tube 14 has two openings 15, 15' for measuring beams 11, 11', specifically a first opening 15 for first measuring beam 111 and a second opening 15' for second measuring beam 11' Beam splitter 8 may have as many reflecting surfaces as measuring beams are desired.

These reflecting surfaces also determine the number of openings in centering tube 14.

Figure 2:
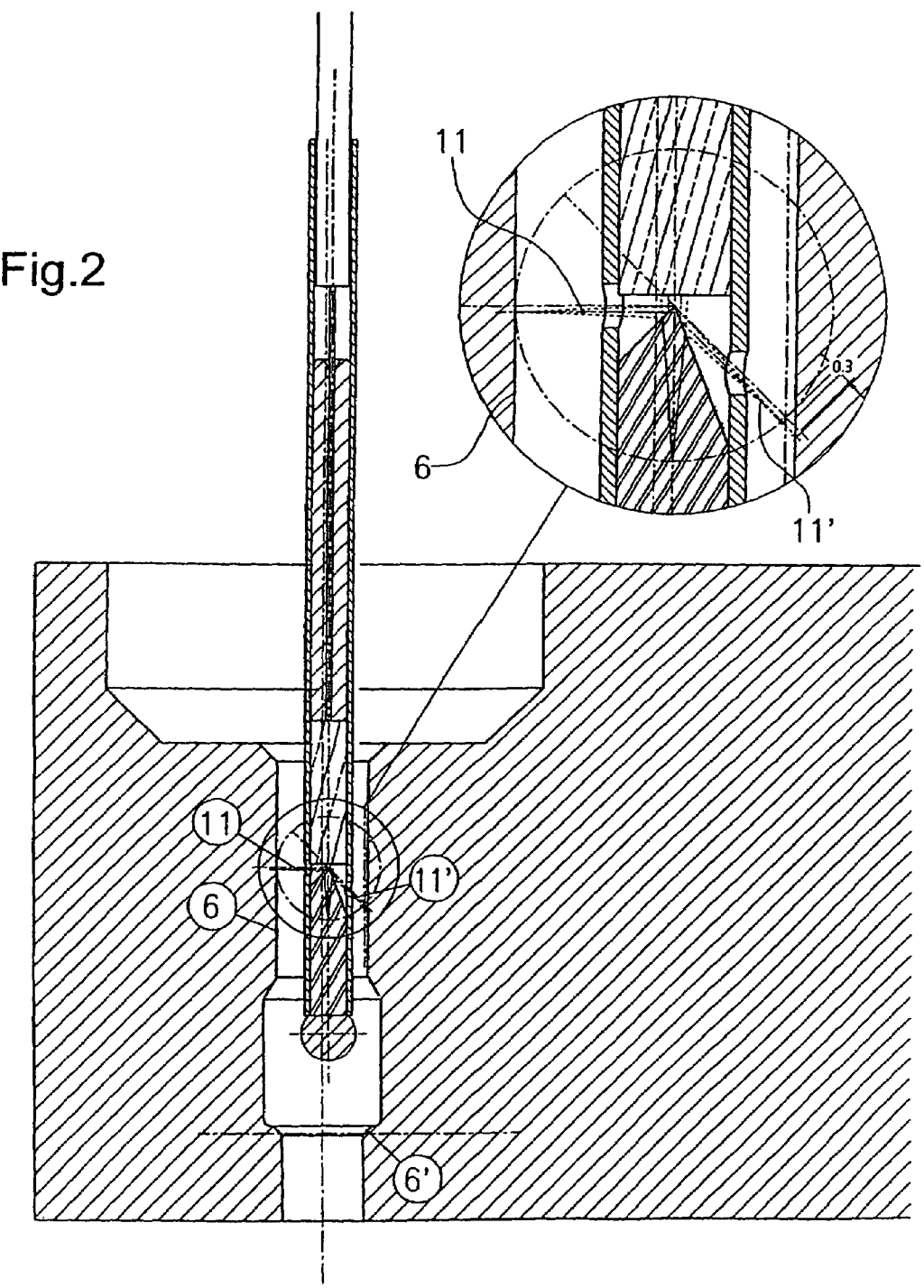
FIG. 2 shows the interference measuring probe shown in FIG. 1 in a first measuring position for scanning a pilot hole of a common-rail valve body.
Figure 3:
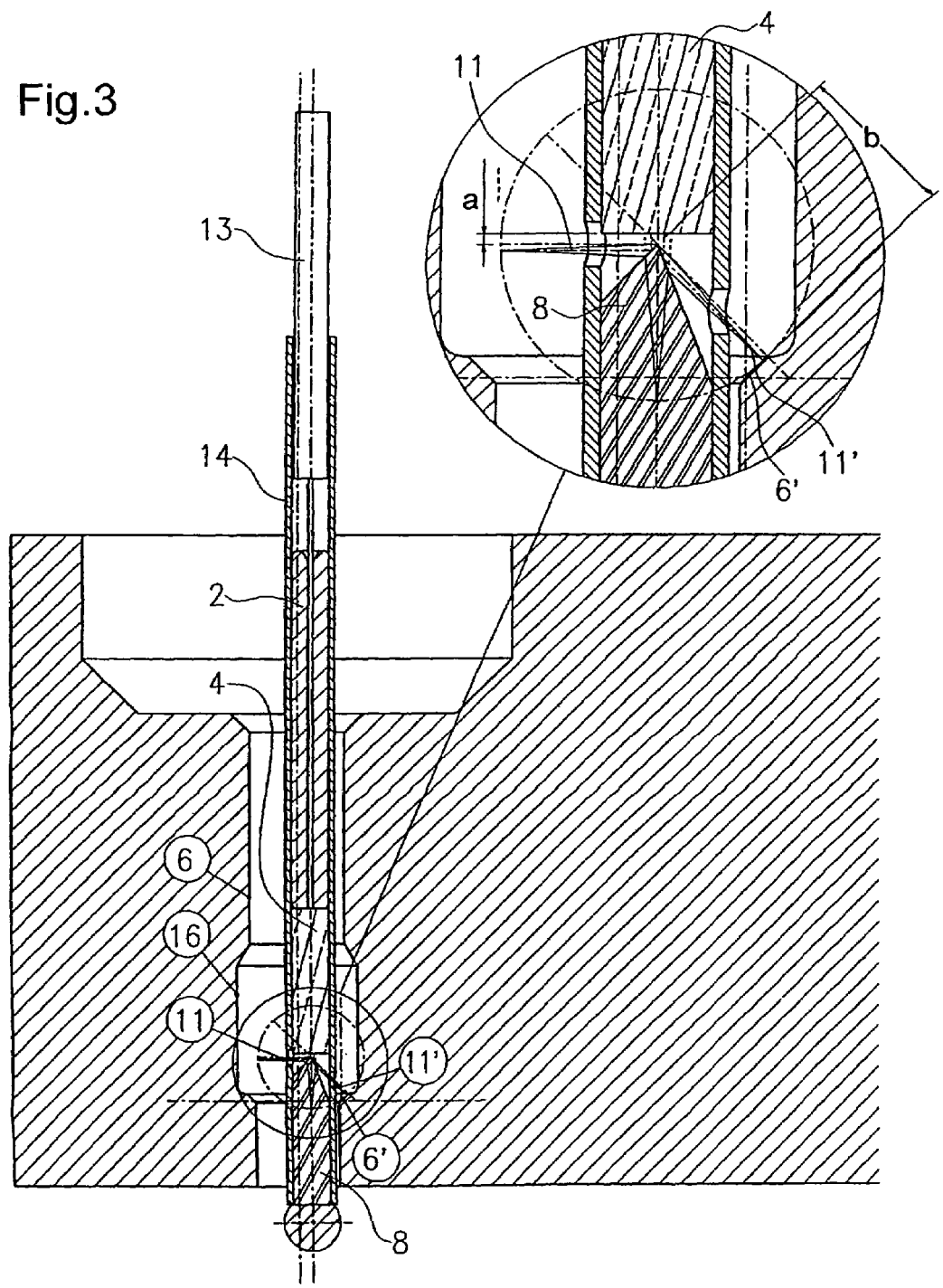
FIG. 3 shows the interference measuring probe shown in FIG. 1 in a second measuring position for scanning a valve seat of the common-rail valve body shown in FIG. 2.

The measurement of the alignment is shown once more in FIGS. 2 and 3 on the same drawing scale in reference to the common rail valve body as an example. In this case, the alignment of valve seat 6' in relation to pilot hole 6 is to be tested; the internal rotational surface of pilot bore 6 is thus used as a reference test surface and the internal rotational surface of valve seat 6' is used as a test surface, the position of which in relation to the reference test surface is to be measured.

FIG. 2 shows the interference measuring probe of the present invention in a first measuring position for scanning the internal rotational surface of valve seat 6' using first measuring beam 11. In doing so, second measuring beam 11' for scanning the internal rotational surface of valve seat 6' produces no measuring signal because the internal rotational surface of pilot hole 6, which is struck by second measuring beam 11', is located outside the measuring range of second measuring beam 11'. During scanning, the measuring probe is kept immobile while the valve body rotates about the hole axis. Of course, the valve body may also be kept immobile while the measuring probe rotates.

FIG. 3 shows the interference measuring probe of the present invention in a second measuring position for scanning the internal rotational surface of valve seat 6' using a second measuring beam 11'. In doing so, first measuring beam 11 for scanning pilot hole 6 produces no measuring signal because a hole surface 16, which is struck by first measuring beam 11 and has a greater diameter than pilot hole 6, is located outside of the measuring range of first measuring beam 11. In this case also, the measuring probe is kept immobile during scanning while the valve body rotates about the hole axis. However, in this case it is also possible for the valve body to be kept immobile during scanning while the measuring probe moves.

In order to reach the second position for scanning the internal rotational surface of valve seat 6' shown in FIG. 3 from the first measuring position for scanning the internal rotational surface of pilot hole 6 shown in FIG. 2, the measuring probe must be moved in axial direction and in radial direction, in the present case, for example, by approximately 3 mm in the axial direction and by approximately 0.1 mm in the radial direction.

As shown in FIGS. 2 and 3, a ball preferably made of ruby may be additionally affixed to the end of the measuring probe of the present invention, as a result of which the measuring probe may also be used together with an appropriate measuring machine as a mechanical caliper.

The detail enlargement of the measuring probe shown in FIG. 3 including both measuring beams 11, 11' also shows that both measuring beams have identical optical paths; accordingly, their focal points are at an identical distance from edge 10 of beam splitter 8, in this case a distance b of 1.36 mm. Furthermore, it is shown in FIG. 3 that the optical fiber of the optical waveguide has a diameter of 125 mm and a jacket 13 having a diameter of 900 mm, that centering tube 14 has an external diameter of 1.3 mm and an internal diameter of 1 mm and that centering part 2 is made of a ceramic material. Furthermore, optical system 4 is located at a distance a of 0.15 mm from 8.

According to the present invention, optical paths of the measuring beams of absolutely identical length are achieved by reflection. A short measuring time and high measuring accuracy result from the single tuning of the modulation interferometer for the scanning of multiple test surfaces. Preferably, the system of the present invention allows simple assembly with simultaneous precise alignment of the components by a centering tube. The elimination of a modifying operation and the precise alignment of the components result in high measuring accuracy. The reflecting prism may be manufactured from a suitable material in a simple manner without it being necessary to take a refractive index into account. According to the present invention, the number of measuring beams may be increased in order to be able to scan more than two test surfaces or more than one reference test surface and one test surface simultaneously. This may be achieved, for example, by increasing the number of reflective surfaces of the reflecting prism.

The previously described deflection of the partial measuring beams with respect to direction and optical path as a function of the position and shape of the test surfaces while considering that only one partial measuring beam is orthogonally focused on the different test surfaces at a time may be implemented, for example, by providing the individual reflective surfaces with different dielectric layers even without taking into account that only one partial measuring beam is orthogonally focused on the different test surfaces at a time, by deflecting the partial measuring beams, for example either with parallel polarization or orthogonal polarization and analyzing the measured signals while taking the polarization into account. Of course, these two variants may also be combined and an independent or mutual combination with the variant, according to which the light beams emitted by the interference measuring probe may be "switched on and off" using an optical shutter and thus analyzed in succession is possible.

What is claimed is:

1. A method for measuring at least one test surface of a workpiece and a reference test surface of the workpiece, lying relative to it, comprising:

causing an interference measuring probe to emit a first measuring beam aligned with respect to the reference test surface;

emitting at least one second measuring beam via the interference measuring probe that is aligned with respect to at least the at least one test surface.

2. The method as recited in claim 1, wherein:

each one of the first measuring beam and the at least one second measuring beam is produced by splitting a light beam.

3. The method as recited in claim 1, wherein:

the first measuring beam has an optical path of a length that is identical with that of the at least one second measuring beam.

4. The method as recited in claim 1, wherein:

at least one of the first measuring beam and the at least one second measuring beam is orthogonal to at least one of the at least one test surface and the reference test surface.

5. The method as recited in claim 1, further comprising:

in a measuring position of the interference measuring probe, focusing only one of the first measuring beam and the at least one second measuring beam on one of the test surface and the reference test surface.

6. The method as recited in claim 1, further comprising:

in a measuring position of the interference measuring probe, focusing at least two differently polarized measuring beams on different surfaces of the at least one test surface and the reference test surface.

7. The method as recited in claim 1, further comprising:

in a measuring position of the interference measuring probe, focusing the first measuring beam and the at least one second measuring beam on different surfaces of the at least one test surface and the reference test surface.

8. The method as recited in claim 1, further comprising:

measuring an alignment of different internal rotational surfaces.

9. A device for measuring at least one test surface of a workpiece and a reference test surface of the workpiece, lying relative to it, comprising:

an interference measuring probe that emits a first measuring beam aligned with respect to the reference test surface, wherein:

the interference measuring probe emits at least one second measuring beam aligned with respect to at least the at least one test surface.

10. The device as recited in claim 9, further comprising:

a reflecting prism by which each of the first measuring beam and the at least one second measuring beam is produced by splitting a light beam.

11. The device as recited in claim 9, wherein:

the first measuring beam has an optical path of a length that is identical with that of the at least one second measuring beam.

12. The device as recited in claim 9, wherein:

one of the first measuring beam and the at least one second measuring beam is orthogonal to one of the test surface and to the reference test surface.

13. The device as recited in claim 9, wherein:

in one measuring position of the interference measuring probe, only one of the first measuring beam and the at least one second measuring beam is focused on one of the test surface and the reference test surface.

14. The device as recited in claim 9, further comprising:

a reflecting prism, wherein:

in one measuring position of the interference measuring probe, at least two differently polarized measuring beams that are produced by the reflecting prism polarizing at least two input light beams differently are focused on different surfaces of the at least one test surface and the reference test surface.

15. The device as recited in claim 9, further comprising:

an electronic shutter, wherein:

in one measuring position of the interference measuring probe, at least two measuring beams that are focused via the electronic shutter in a time-division multiplexer are focused on different surfaces of the at least one test surface and the reference test surface.

16. The device as recited in claim 9, wherein:

all the components used to form the first measuring beam and the at least one second measuring beam have an at least partially cylindrical, external form with an identical external diameter and are installed in a centering tube having a corresponding internal diameter.

17. The device as recited in claim 9, wherein:

the device is adapted for measuring an alignment of different internal rotational surfaces.

\* \* \* \* \*